METHODS OF ENCAPSULATING ARTICLES

Filed July 18, 1955 2 Sheets-Sheet 1

INVENTOR.
F. J. WAGNER
J. H. WARD, JR.
BY [signature]
ATTORNEY

INVENTOR.
F. J. WAGNER
J. H. WARD, JR.
BY C. H. Manz
ATTORNEY

United States Patent Office 2,857,626

Patented Oct. 28, 1958

2,857,626

METHODS OF ENCAPSULATING ARTICLES

Fred J. Wagner and James H. Ward, Jr., Winston-Salem, N. C., assignors to Western Electric Company, Incorporated, New York, N. Y., a corporation of New York Application July 18, 1955, Serial No. 522,656

2 Claims. (Cl. 18—59)

This invention relates to methods of encapsulating articles, and more particularly to methods of encapsulating electrical components.

In the manufacture of certain types of electrical components, such as coils, transformers, capacitors and the like, the need arises frequently to protect these electrical components so that they will be substantially unaffected by varying atmospheric conditions, mechanical shock, and moisture. It is a common practice to impregnate such electrical components with suitable impregnants and subsequently to encapsulate the impregnated electrical component in an insulating material. One of the greatest disadvantages of conventional encapsulating processes is that air frequently becomes entrapped in the insulating material and in interstices in the electrical component. These air inclusions or voids may cause corona and thus result in impairment of the electrical properties of the component. Further, due to possible expansion and contraction of the trapped air under varying temperature conditions, the insulating material may crack and thereby expose the component to moisture and the deleterious effects resulting therefrom.

It is an object of this invention to provide new and improved methods of encapsulating articles.

Another object of this invention is to provide new and improved methods of encapsulating electrical components.

A method of encapsulating articles which illustrates certain features of the invention may include the steps of submerging the article completely in a liquid, and subsequently pouring an escapsulating material through the liquid to displace the liquid surrounding the article with the encapsulating material.

More specifically a method of encapsulating electrical components which illustrates certain features of the invention may include prepositioning the electrical component in a mold and then placing the mold containing the electrical component in a drying and impregnating unit. In the drying and impregnating unit the electrical component is treated to remove any moisture which may be present therein. Then the mold containing the dried electrical components is submerged completely in a hot, insulating, impregnating oil. After an impregnation cycle of suitable length, the mold containing the prepositioned electrical component is removed from the drying and impregnating unit but maintained submerged completely in the impregnating oily. Subsequently a molten encapsulating resin is poured through the impregnating oil into the mold cavity to displace completely the impregnating oil with the encapsulating resin.

A complete understanding of the invention may be had by reference to the following detailed description, when read in conjunction with the appended drawings, in which.

Figure 1:
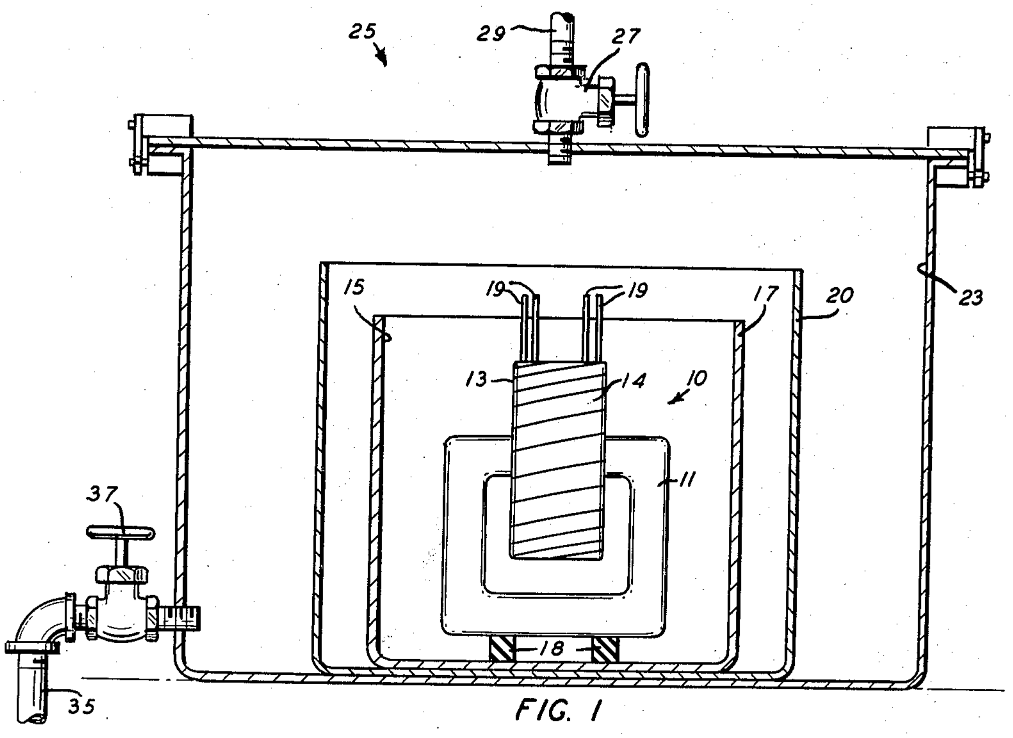
Fig. 1 is a vertical section of a drying and impregnating unit in which a mold containing a prepositioned electrical component has been placed.

Referring now to Fig. 1, there is shown a transformer 10 having a core 11 and a coil 13 wrapped with a tape 14, such as, for example, a fabric tape or one composed of other insulating material, such as paper or the like. The transformer 10 is an example of one type of electric component which may be encapsulated in accordance with the invention.

The transformer 10 is first prepositioned, as shown in Fig. 1, in a cavity 15 in an open-top mold 17, where it rests on a pair of spacers 18—18 made of a suitable dielectric material, such as phenol fiber or the like. Preferably the spacers 18—18 are designed to prevent accidental displacement of the transformer once it has been prepositioned. The mold cavity 15 is of a depth sufficient to permit the transformer 10 to be surrounded completely thereby, except for the outer extremities of terminal leads 19—19 extending upwardly from the coil 13.

Once the transformer 10 has been prepositioned properly within the mold 17, the mold is placed within a hollow, open-top impregnating container 20 with the bottom of the mold resting on the bottom of the impregnating container, as shown in Fig. 1. The impregnating container 20 has a depth sufficient to permit the mold 17 containing the prepositioned transformer 10 to be submerged completely in a fluid which may substantially fill the interior of the impregnating container.

The impregnating container 20 containing the mold 17 with the prepositioned transformer 10 therein is then transferred to the interior of a chamber 23 forming part of a drying and impregnating unit, indicated generally as numeral 25 in Fig. 1. The interior of the chamber 23 is then sealed off from the atmosphere and the transformer is heated within the chamber 23 at an elevated temperature by any suitable means, such as steam coils (not shown). Satisfactory results have been obtained by heating the chamber at a temperature of about 245° F. for about approximately four to six hours to drive off from the transformer any moisture which may be present (e. g. moisture contained in the tape 14 and on the coverings on the conductors of the coil 13). Substantially all of the moisture in the transformer 10 is driven off during this drying process.

After the drying cycle has been completed, the interior of the chamber 23 is connected through a valve 27 to a conduit 29 communicating with suitable evacuation means (not shown) such as a vacuum pump, which functions to create a partial vacuum of a minimum of two to three millimeters of mercury within the interior of the chamber. If desired, the entire drying cycle may be carried out in a partial vacuum.

Figure 2:
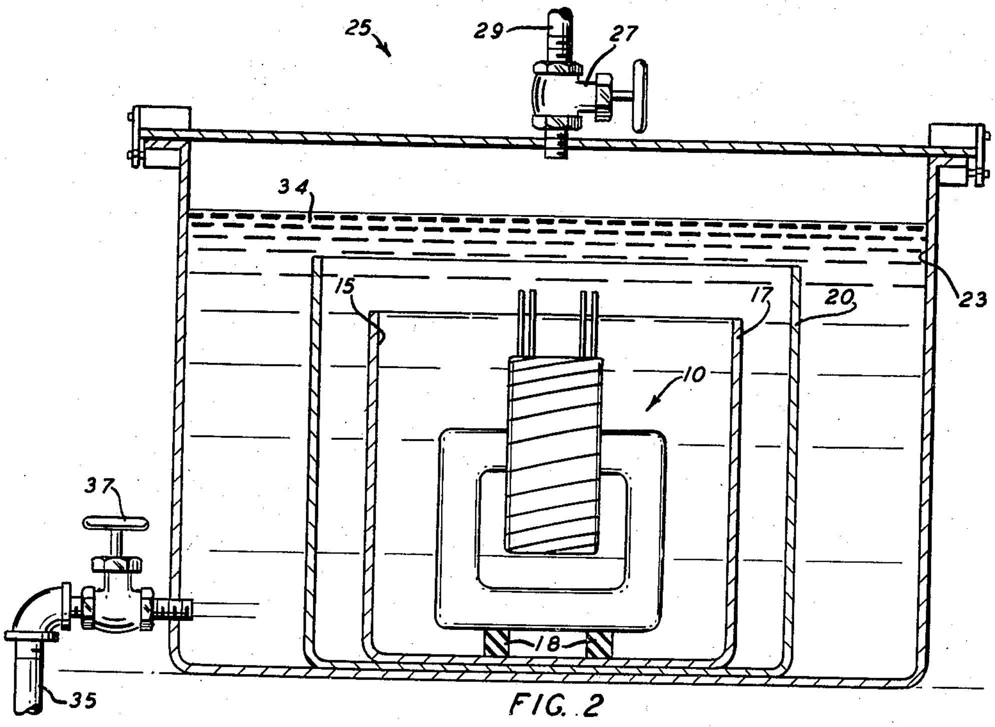
Fig. 2 is a vertical section of the drying and impregnating unit during an impregnation cycle.

As the vacuum is drawn within the chamber 23, the moisture which has been driven off during the drying cycle from the transformer 10 is evacuated via the conduit 29. Simultaneously an insulating impregnating fluid, such as an impregnating oil 34, which may be, for example, No. 10–C "Transil" oil, manufactured by General Electric Company, Schenectady, N. Y., "Primol D," manufactured by Esso Standard Oil Company of New York, or the like, is admitted into the evacuated chamber 23 through a conduit 35 connected thereto through a valve 37 (Fig. 2). By virtue of the partial vacuum created within the chamber 23, the impregnating oil 34 is drawn into the chamber and is allowed to fill the interior thereof to a level at least sufficient to submerge completely the impregnating container 20 and the mold 17 containing the prepositioned transformer 10.

The impregnating oil 34, after it has risen above the level of the impregnating container 20, will flow into the impregnating container and the mold 17 and fill all of the interstices of the transformer 10. The air formerly entrapped in such interstices and displaced by the impregnating oil 34 is evacuated through the conduit 29. After the impregnating cycle has been continued for a proper time, for example, five to seven hours, there is substantially no entrapped air or voids in the transformer 10 and the transformer is impregnated completely with the oil. The impregnating cycle is carried out while maintaining a temperature of approximately 245° F. After the impregnation cycle is completed, the vacuum is broken to permit the impregnating oil exclusive of that contained in impregnating container 20 to recede from the chamber 23 through the conduit 35.

Figure 3:
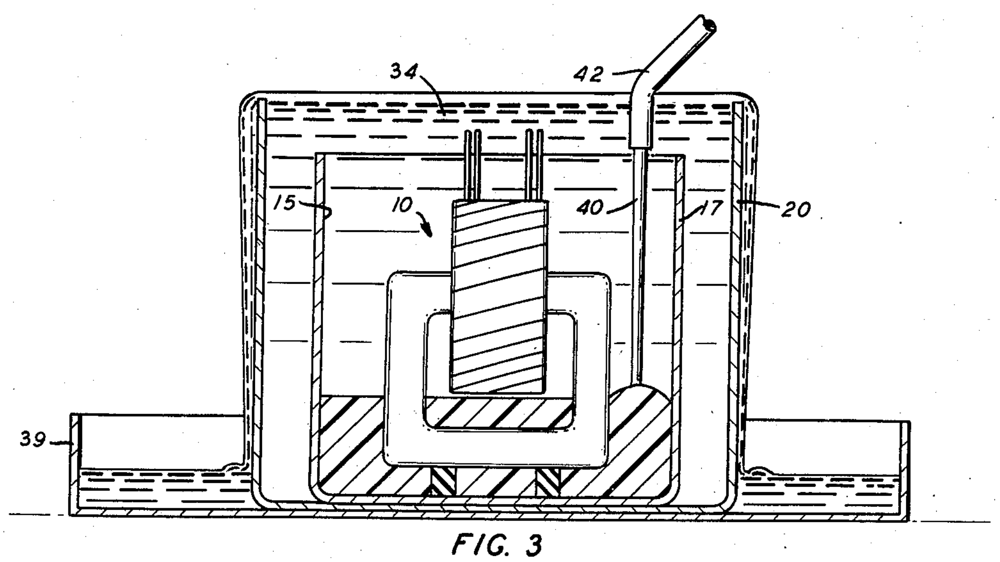
Fig. 3 is a vertical section of the mold with the prepositioned electrical component submerged in an impregnating fluid, which illustrates the displacement of the impregnating fluid within the mold cavity by an encapsulating resin.

The impregnating container 20 with the mold 17 submerged completely in the impregnating oil 34 contained therein is then removed from the chamber 23 of the drying and impregnating unit 25, and the mold is permitted to remain submerged within the impregnating oil, as shown in Fig. 3. The container 20, with its contents, is placed in a catch basin 39. Immediately after removing the impregnating container 20 from the chamber 23, a liquid thermosetting encapsulating resin 40, such as an epoxy or ethoxylene resin, containing an appropriate hardener, is poured through the impregnating oil 34 into the cavity 15 of the mold 17, as shown in Fig. 3.

To facilitate the pouring and to lessen the possibility of air introduction by such pouring the liquid encapsulating resin 40 is discharged into the cavity 15 of the mold 17 from a suitable supply thereof (not shown) through a nozzle 42 (Fig. 3), the discharge end of which is positioned beneath the surface of the impregnating oil 34 contained within the impregnating container 20. The encapsulating resin 40 is poured directly into the cavity 15 of the mold 17 through the impregnating oil 34. Because, by choice, the specific gravity of the encapsulating resin 40 is greater than that of the impregnating oil 34, the resin displaces the impregnating oil within the cavity 15 of the mold 17. The pouring of the liquid encapsulating resin 40 is continued until it displaces completely the impregnating oil 34 within the cavity 15 and encases the transformer 10. The excess impregnating oil 34 displaced from the cavity 15 spills over the sides of the impregnating container 20 and is collected by the catch basin 39 for reuse, as shown in Fig. 3.

Figure 4:
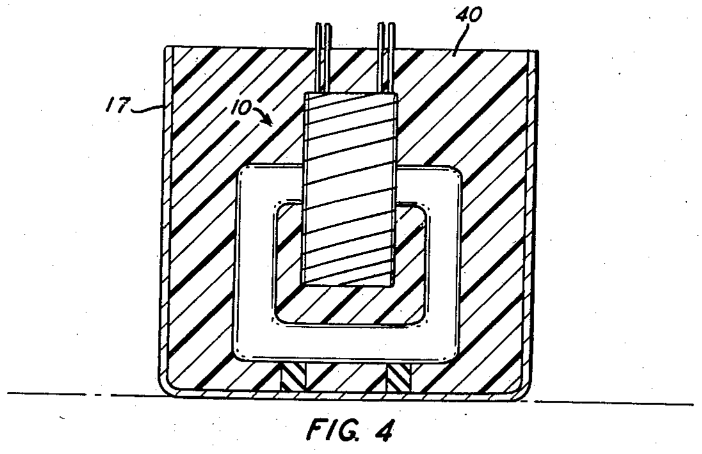
Fig. 4 is a vertical section of the finished encapsulated electrical component.

The mold 17, which now has its cavity 15 filled completely with the liquid encapsulating resin 40, is allowed to remain submerged in the hot impregnating oil 34 within the impregnating container 20 for a predetermined time, for example, approximately one hour for the purpose of maintaining the resin 40 in a fluid state so as thoroughly to envelop the article and to enable the escape of entrapped air and oil by travel through the resin. The mold 17 is then removed from the hot impregnating oil 34 and is allowed to cool to room temperature during which time the encapsulating resin solidifies. Thereafter, the transformer 10 enclosed in the solidified encapsulating resin 40, as shown in Fig. 4, is removed from the mold 17 and placed in a suitable curing oven (not shown), wherein it is baked and cured at an elevated temperature. It will be understood that certain curing operations and resins will require the retention of a solidified resin in the mold 17, or the like, during the curing of the solidified resin inasmuch as the resin may be caused to enter a liquid state before reaching a final set. When the curing step has been completed, the encapsulating resin 40 has been converted into an infusible solid. The encapsulated transformer 10, is then removed from the curing oven as the finished product. To facilitate the removal of the encapsulated transformer 10 from the mold 17, it may be desirable to apply a suitable "anti-stick" material to the walls of the mold cavity 15.

Due to the procedure whereby the transformer 10, after the impregnation cycle, is never exposed to the atmosphere, the finished encapsulated transformer 10 is hermetically sealed and substantially free of all air inclusions, so that it is not subject to the deleterious effects resulting therefrom. The result is a finished product which possesses great electrical and mechanical stability.

An example of a suitable thermosetting encapsulating resin 40 is "Araldite" 6060, an unmodified epoxy resin to which a suitable hardener, such as Hardner HN-901, is added. Hardner HN-901 is essentially phthalic acid anhydride. Both the "Araldite" 6060 and Hardner HN-901 are manufactured by Ciba Co., Inc. The resin 40, when composed of a hardener and epoxy resin as above mentioned, behaves as a thermoplastic resin below the temperature of approximately 392° F., at which temperature the resin sets into an infusible resin after a cure time of approximately one-and-one-half hours. The resin 40 may also set at a curing temperature of 250° F. and a curing time of approximately twenty-four hours. As hereinbefore mentioned, the resin 40 is caused to be submerged in the impregnating oil 34 at the temperature of approximately 245° F. for a period less than twenty-four hours. This particular thermosetting encapsulating resin is entirely compatible for the purposes of this invention with impregnating oils such as "Transil" oil and "Primol D"; that is, it is insoluble in such impregnating oils and its specific gravity is greater than either of the above examples of impregnating oils, so that these impregnating oils will be displaced when the encapsulating resin is poured into the mold cavity. Various types of epoxy resins are described in an article on pages 301 et seq. of the September 1953 issue of "The Rubber Age and Synthetics."

Where the terms "encapsulating" or "encapsulating process" are used in the specification and claims it is to be understood that the same may include "potting" or "potting process."

The specific examples of impregnating oils and encapsulating resins described hereinabove have been mentioned merely by way of example and are not to be considered in any manner to limit the scope of the invention. It will be understood that in some applications the impregnating step may be eliminated due to the fact that the article to be encapsulated does not lend itself to impregnation. In such cases it may still be desirable to submerge the article in a suitable liquid which will fill interstices, crevices, and openings in the article and displace any air which might be entrapped therein. Thus, when the encapsulating material is poured subsequently through the liquid to displace it, the article is encapsulated without air inclusions. Manifestly, numerous substitutions in and modifications of the above-described process may be made without departing from the spirit and scope of the invention.

What is claimed is:

1. The method of encapsulating articles capable of being impregnated which comprises the steps of placing the article to be encapsulated into a mold, filling the mold with an impregnating fluid at an elevated temperature, positioning the mold within a container of a size and configuration such that the container will contain fluid displaced from the mold whereby the displaced fluid will surround the mold to a depth sufficient to maintain the mold and the interior thereof at an elevated temperature for a period of time, and displacing the impregnating fluid at an elevated temperature from the mold and into the container by a thermosetting encapsulating resin having a specific gravity greater than that of the impregnating fluid and having a solidification temperature lower than the elevated temperature of the impregnating fluid so that the encapsulating resin is maintained in a fluid condition by the elevated temperature of the displaced impregnating fluid for a period of time sufficient to cause the resin to envelop completely the article and to permit escape of entrapped air and fluid from the article.

2. The method of encapsulating articles capable of being impregnated which comprises the steps of placing the article to be encapsulated into a mold, filling the mold with an impregnating fluid at an elevated temperature, positioning the mold within a container of a size and configuration such that the container will contain fluid displaced from the mold whereby the displaced fluid will surround the mold to a depth sufficient to maintain the mold and the interior thereof at an elevated temperature for a period of time, displacing the impregnating fluid at an elevated temperature from the mold and into the container by a thermosetting encapsulating resin having a specific gravity greater than that of the impregnating fluid and having a solidification temperature lower than the elevated temperature of the impregnating fluid so that the encapsulating resin is maintained in a fluid condition by the elevated temperature of the displaced impregnating fluid for a period of time sufficient to cause the resin to envelop completely the article and to permit escape of entrapped air and fluid from the article, removing the mold from the container whereby the encapsulating material may solidify, cooling the encapsulating material, and separating the mold from the cooled encapsulated material.

References Cited in the file of this patent

UNITED STATES PATENTS

| | | |
|---|---|---|
| 1,455,199 | Groten | May 15, 1923 |
| 2,571,397 | Wells | Oct. 16, 1951 |